Oct. 2, 1956  A. F. BEMELMANS  2,765,268

METHOD OF MANUFACTURING CASTING
MOULDS OR PRESSING MOULDS
Filed June 25, 1952

INVENTOR
Alfons Frans Bemelmans
BY *Fred M. Vogel*
AGENT

United States Patent Office 2,765,268
Patented Oct. 2, 1956

2,765,268

METHOD OF MANUFACTURING CASTING MOULDS OR PRESSING MOULDS

Alfons Frans Bemelmans, Eindhoven, Netherlands, assignor to Hartford National Bank and Trust Company, Hartford, Conn., as trustee Application June 25, 1952, Serial No. 295,588

Claims priority, application Netherlands July 4, 1951

2 Claims. (Cl. 204—6)

It is known, for manufacturing objects by casting, die-casting or moulding, to utilise casting moulds, die-casting moulds or pressing moulds which are constituted by a plurality of parts and which, in the closed state, embrace a cavity which corresponds to the object to be manufactured.

The material used for the objects to be manufactured may be, for example, either thermo-plastic or thermo-setting artificial resins in the form of powder or pastilles, or pulverulent, substantially inorganic substances yielding ceramic objects after a thermal treatment, or molten metals which are introduced into the moulds.

As a rule, the constitutive parts of such moulds are manufactured by a chipping shaping operation. For example, a block of metal thus has provided in it a cavity which corresponds to part of the object to be obtained. As an alternative, the cavity may be obtained by a moulding operation. However, in either case, an expensive after-treatment is required to ensure accurate and smooth finishing of the cavities.

It is also possible to manufacture the parts of the mould by surrounding a model or parts of a model of the object to be manufactured with a layer of material and dividing the layer of material or a skin into parts in such manner that the model may be removed therefrom, whereupon the parts of the skin are joined again. The skin of material may consist, for example, either of gypsum or chamotte, or of metal which is applied to the model by casting, by galvanic means or in another manner. The expensive after-treatment then may in most cases be dispensed with.

The present invention relates to a method of manufacturing casting moulds, die-casting moulds or pressing moulds which are constituted by two or more parts and in which the said disadvantages are avoided. According to the invention, such a mould manufactured by covering an object with a hard layer and dividing the layer into self-detaching parts of the mould is characterized in that the object is obtained from a full-size model of the product to be ultimately manufactured in the mould by dividing the mould wholly or in part by planes into two or more parts which have provided between them plane spacers which extend, if desired, beyond the surface of the object, and by applying a hard layer to the model provided with spacers and subsequently removing from the layer a part such that, after the object has been removed and the parts of the mould have been joined, a space subsists which substantially corresponds to the shape and the size of the product to be manufactured.

In one embodiment of the invention, when use is made of the said method, one or more of the plane spacers are preferably constituted by choosing the dimensions of the model in the closing direction of the mould to be larger than the corresponding dimensions of the product to be ultimately manufactured.

In another embodiment of the invention, the object manufactured according to the model for the use of the method is advantageously provided with projecting parts which may be used for providing centering pins, cavity pins, sliding pins, turning off pins or similar mechanical expedients, which considerably simplify the operation of joining the skins of material into the ultimate shape and which readily permit of obtaining a high degree of accuracy.

In a further embodiment of the invention, the hard layer provided on the object preferably consists of metal which is caused to be deposited on to the object by galvanic means.

In again another embodiment of the invention, the object to be covered with a hard layer may be obtained in a convenient way from an existing mould constituted by a plurality of parts by moulding therewith an object consisting of the material of which the object is to be manufactured, but by closing the mould with the use of spacers to such extent only that the dimensions of the object in the closing direction of the mould are larger than the corresponding dimensions of the product to be ultimately manufactured. This may be effected, for example, in a mould constituted by two parts, by providing a ring between the parts and closing the mould up to this ring. The object thus obtained may directly be used for use of the method according to the invention and it thus readily permits of manufacturing a larger number of replica moulds, or it is possible, by combining a plurality of the resultant objects to form a suitable assembly, to obtain from the assembly a mould constituted by a plurality of parts, from which a plurality of identical products may be obtained in one moulding process.

As general advantages of the method according to the invention we may mention:

(1) It is not necessary for the upper and lower part of the mould to be manufactured so as to fit on one another.

(2) One positive suffices for manufacturing a mould constituted by two or more parts.

(3) All constitutive parts of a mould constituted by two or more parts may be manufactured in one galvanic process.

(4) Any desired number of moulds may be manufactured from one positive, which moulds are wholly identical in contradistinction with milled moulds.

(5) Replicas of existing moulds may be manufactured in a simple manner.

In order that the invention may be readily carried into effect, an example will now be described in detail with reference to Figs. 1, 2, 3 and 4 of the accompanying drawings, of which:

Figure 1:
Fig. 1 is a sectional view of an object to be manufactured.
Figure 2:
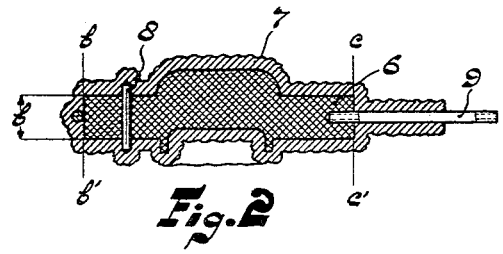
Fig. 2 shows an object comprising a skin which has been provided by galvanic means.

The circular cover 1 of Fig. 1 is divided by a plane taken along a—a' the halves thus obtained being displaced through a distance b as shown in Fig. 2. From this operation ensues an object 6, which is indicated by double cross-hatching in Fig. 2. The object 6 is surrounded in known manner by a galvano-plastic metal layer 7, so that a body ensues as shown in cross-section in Fig. 2. This figure furthermore shows a centering pin 8 and a pin 9 from which the object may be suspended in the galvanic bath.

Figure 3:
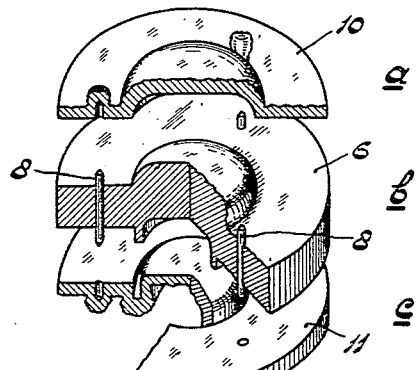
Fig. 3 is a perspective view of the three parts into which the body of Fig. 2 breaks up after the superfluous material has been removed.

After the metal layer has grown up to the required thickness, the superfluous metal along the cylindrical surface $bb'$—$cc'$ is removed, whereafter an assembly ensues which breaks up into three parts as shown in Figs. 3a, b and c. In Fig. 3, one metal skin is indicated by 10, Fig. 3b shows the object 6 on which the deposit is provided, and Fig. 3c shows the other metal skin 11.

Figure 4:
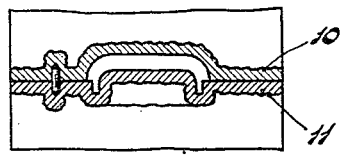
Fig. 4 shows the mould which is ultimately obtained.

Fig. 3 furthermore clearly shows fit pins 8 which are provided in the object and which permit of carrying out the ultimate assembling of the parts 10 and 11 to form a casting mould, die-casting mould or pressing mould in such manner that an assembly ensues which closes and is adjusted accurately. Fig. 4 shows in what manner the parts 10 and 11 ultimately constitute a mould with which the desired circular cover 1 may be obtained.

As a rule, in manufacturing the object, allowance will be made for the properties of the hard layer with which the object is covered and the properties of the material from which the product will be manufactured, such as contraction or expansion.

What I claim is:

1. A method of making a mould for a product to be manufactured constituted by at least two parts comprising furnishing a model of the product to be manufactured, said model having parallel plane surfaces with portions having parallel planes into at least two portions having at least one spacer portion therebetween, inserting at least one centering pin in said spacer portion in a position transverse to said planes and extending beyond said planes, suspending said model in a galvanic bath to completely cover said model and said pin with a metallic hard layer whereby said pin projects into said hard layers at opposite locations to form indentations therein, removing the part of the deposited metal lying between said planes, thereby separating said hard layer mould into at least two parts, removing said model from said mould, and joining the parts of said mould with another centering pin located in said indentations formed in said two parts and with said plane surfaces contacting each other.

2. A method as set forth in claim 1 wherein the dimensions of said model in the closing direction of the mould is larger than the corresponding dimensions of the product to be manufactured.

References Cited in the file of this patent
UNITED STATES PATENTS

| | | |
|---|---|---|
| 1,491,754 | Scherner | Apr. 22, 1924 |
| 1,807,145 | Bart | May 26, 1931 |
| 1,868,788 | Zinser | July 26, 1932 |
| 1,912,889 | Couse | June 6, 1933 |
| 2,000,756 | Heck | May 7, 1935 |
| 2,243,521 | Bishop | May 27, 1941 |